Figure 1:
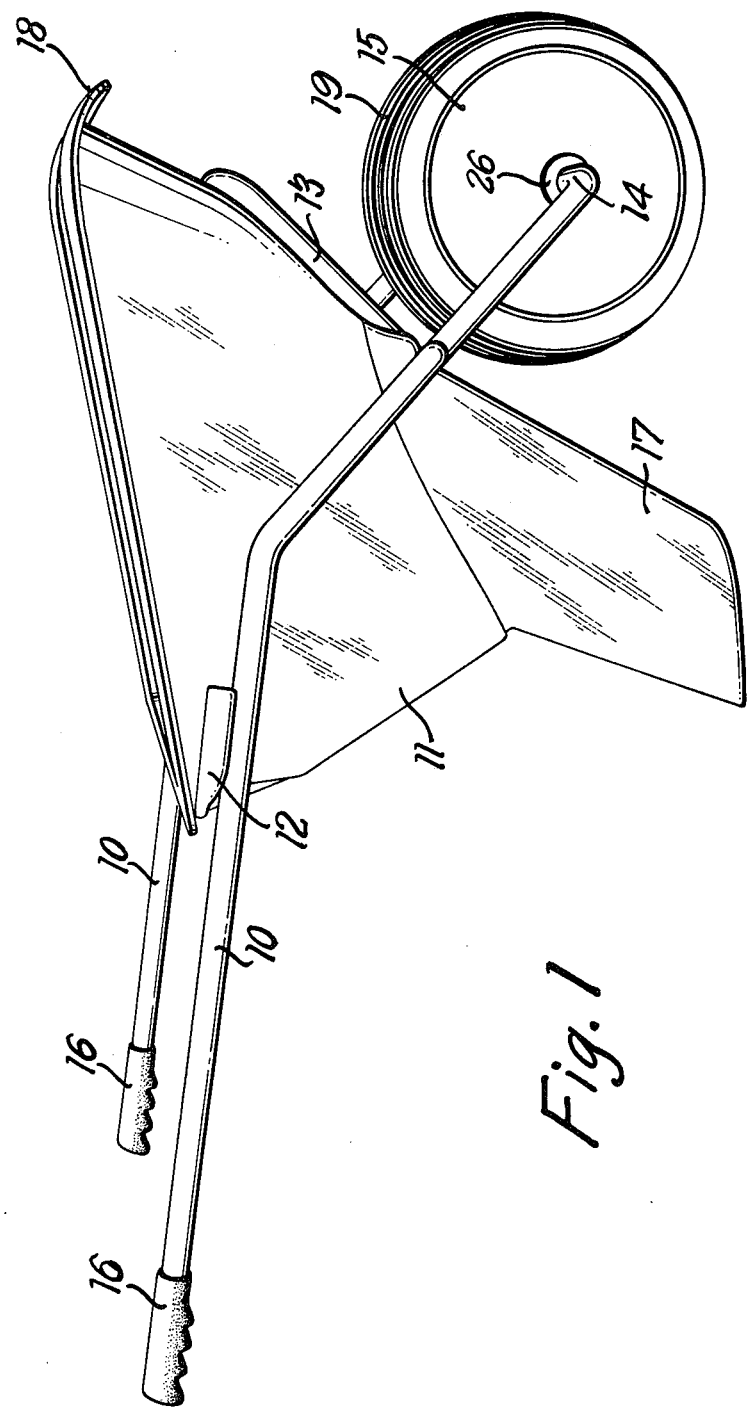

United States Patent [19]

Dyson

[11] 4,058,344
[45] Nov. 15, 1977

[54] GROUND ENGAGING MEMBER FOR MOVABLE STRUCTURES

[75] Inventor: James Dyson, Badminton, England

[73] Assignee: Kirk-Dyson Designs Ltd., London, England

[21] Appl. No.: 663,218

[22] Filed: Mar. 2, 1976

[30] Foreign Application Priority Data

Mar. 5, 1975 United Kingdom ............... 9189/75

[51] Int. Cl.² .............................................. B60B 9/00
[52] U.S. Cl. ................................. 301/7; 301/63 PW; 152/7; 308/237 A; 308/DIG. 7
[58] Field of Search ............ 301/7, 5 R, 5.3, 1, 301/5.7; 63 PW, 63 R; 46/221, 205, 114, 111, 201; 152/7, 8; 280/47.3, 47.31, DIG. 7; 308/16 B, 165, 191, 16.26, 237 R, 237 A, DIG. 3, DIG. 7; 16/45, 46, 25

[56] References Cited

U.S. PATENT DOCUMENTS

| 471,405 | 3/1892 | Terman | 308/237 A |
|---|---|---|---|
| 2,404,269 | 7/1946 | Bennett | 301/1 |
| 3,094,376 | 6/1963 | Thomas | 308/DIG. 7 |
| 3,264,780 | 8/1966 | Doe | 46/221 |
| 3,552,760 | 6/1971 | Sine | 280/47.31 |
| 3,826,511 | 7/1974 | Frank | 280/47.31 |
| 3,827,369 | 8/1974 | Mueller | 280/47.31 |

FOREIGN PATENT DOCUMENTS

1,048,747  1/1959  Germany ...................... 308/DIG. 7

Primary Examiner—Robert B. Reeves
Assistant Examiner—H. Grant Skaggs
Attorney, Agent, or Firm—Kemon & Estabrook

[57] ABSTRACT

The invention relates to a ground engaging member in the form of a ball for supporting load carrying structures, such as wheelbarrows. The ball is preferably moulded from a plastics material, such as a mixture of EVA and low density polyethylene, and is formed in one piece with sockets for receiving stub axles on the frame of the barrow. The stub axles are non-rotatably mounted in an inner cup-shaped nylon bearing rotatably mounted in an outer cup-shaped nylon bearing fixedly received in a socket. The ball may be moulded with treads and ribs.

2 Claims, 7 Drawing Figures

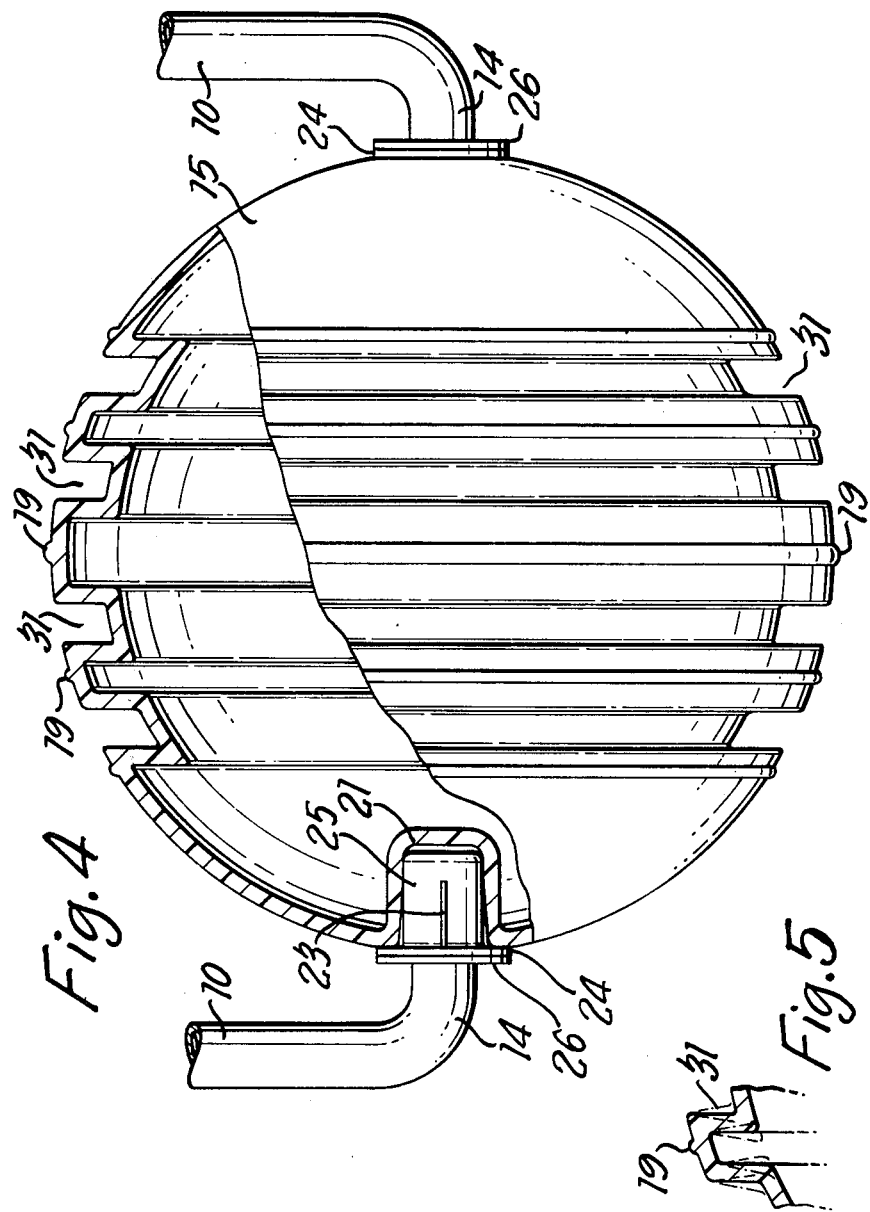

GROUND ENGAGING MEMBER FOR MOVABLE STRUCTURES

This invention relates to ground engaging members for supporting movable structures such as handtrucks, trolleys, pushchairs and bicycles. In particular, the invention is applicable to handtrucks having a load carrying bin, such as a wheelbarrow.

The convention design for a wheelbarrow includes a load carrying bin which is fixedly attached on a frame usually supported by a single ground engaging wheel which is attached to the frame forwardly of the centre of gravity of the barrow.

Such wheelbarrows have a number of disadvantages. Firstly, the wheelbarrow when fully loaded becomes extremely unstable and is liable to tilt to either side of the single forwardly positioned wheel during forward movement. Secondly, the use of a wheel makes it difficult to manoeuvre the wheelbarrow over broken or uneven ground. Furthermore, the provision of a wheel marks a lawn or soft ground especially when the wheelbarrow is loaded.

The object of the invention is to provide an improved ground engaging member which avoids the above disadvantages and which in particular enables the movable structure to ride easily over broken ground.

In its broadest aspect the invention provides a ground engaging member for a movable structure, said member comprising a ball moulded in one piece with diametrically opposite sockets for receiving bearings for the supporting axles of the structure.

In a preferred embodiment the ball is moulded in a plastics material with separate sockets each for receiving a bearing for an axial tube of the stub shaft type. Preferably, the plastics material is a mixture of an ethylene-vinyl acetate (EVA) co-polymer and low density polyethylene.

The ball forming the ground engaging member is conveniently moulded with suitable treads and may also be moulded with ribs extending towards the axis of the ball parallel with the treads so as to provide circumferential strength to the ball at the point where contact is made with the ground.

In the Application of the invention to a movable structure as a wheelbarrow, the wheelbarrow is provided with a frame having a pair of stub shafts adapted to fit within the corresponding sockets of the ball. Each of the shafts is non-rotatably mounted in an inner cup-shaped bearing which is rotatably mounted in an outer cup-shaped bearing non-rotatably mounted in the corresponding socket. The bearings are preferably formed of a hard plastics material such as nylon 6.

Figure 2:
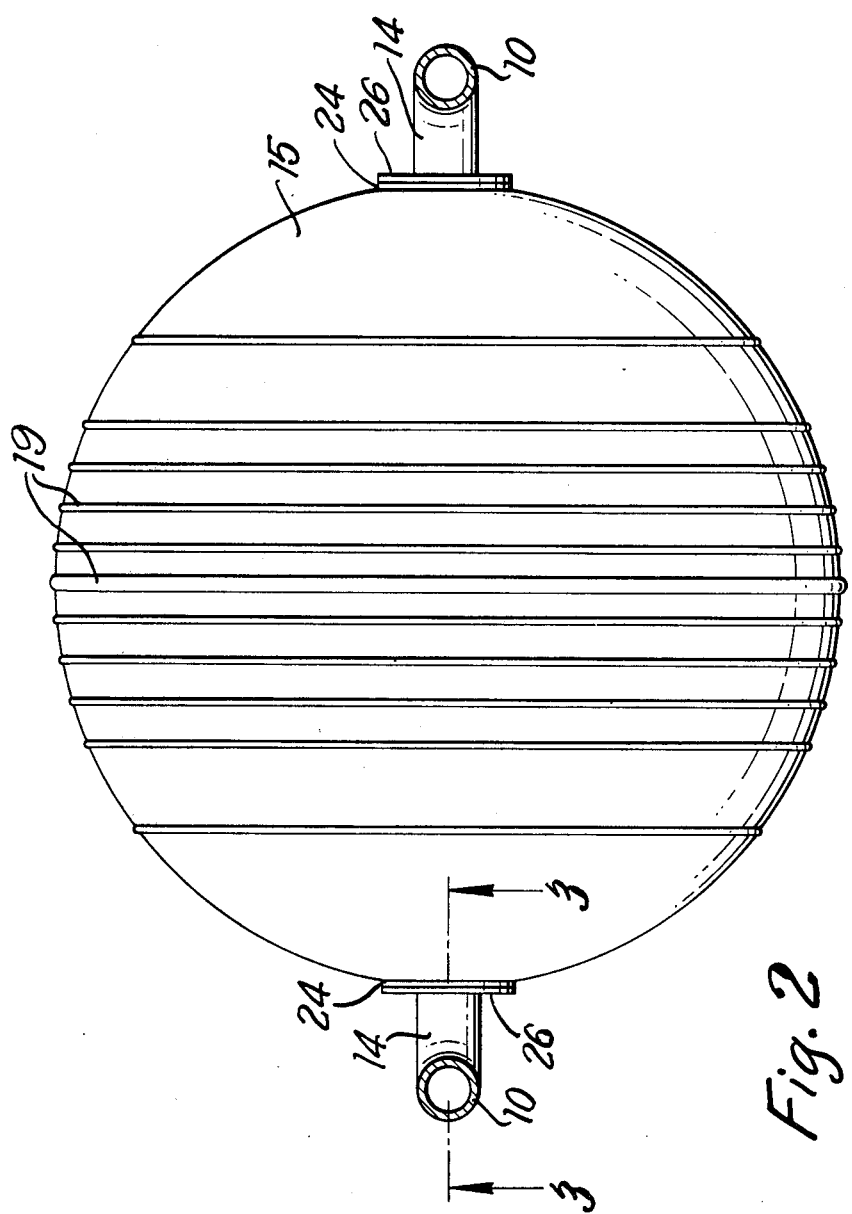
Figure 3:
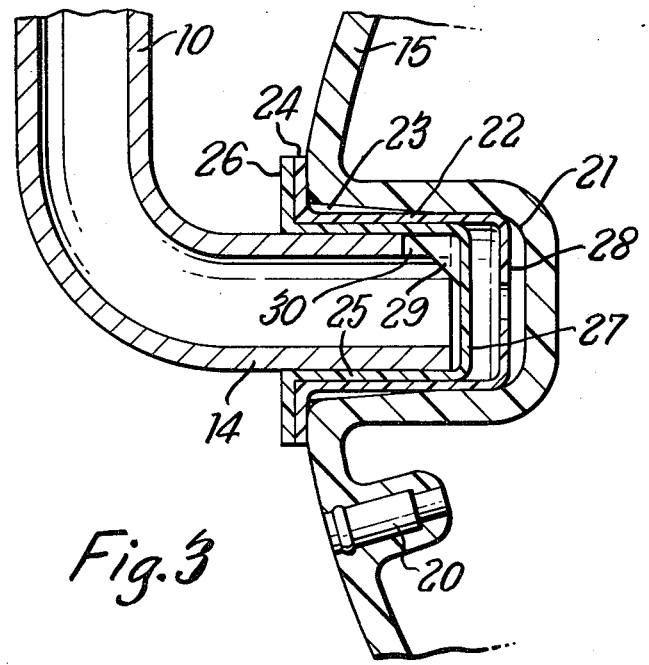
Figure 6:
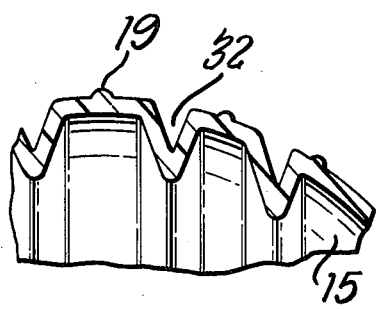
Figure 7:
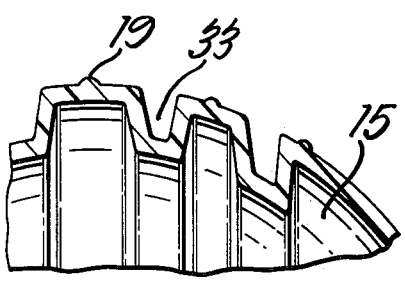

The invention will now be described in greater detail with reference to the accompanying drawings, in which:

FIG. 1 is a side elevation of a wheelbarrow fitted with a supporting ball in accordance with the present invention, FIG. 2 is a sectional view through the frame of the wheelbarrow showing the ball in front elevation, FIG. 3 is a sectional view taken on the line 3—3 of FIG. 2 showing the mounting of the stub axles in the sockets of the ball, FIG. 4 is a view similar to FIG. 2, but showing a modified construction of ball moulded with ribs, FIG. 5 is a detailed view of a rib of the ball of FIG. 4 showing the flexing of the rib during use, and FIGS. 6 and 7 show alternative constructions of ribs for the ball.

As previously mentioned the invention is concerned with the provision of an improved ground engaging member for movable structures which will avoid the disadvantages of a convention wheel. The invention is applicable to all forms of movable structures normally utilising a wheel such as wheelbarrows, golfing trolleys, boat trolleys, sack trolleys, pushchairs and bicycles.

The invention basically comprises a ground engaging member which is of ball like construction. Referring now to FIG. 1 of the drawings the ground engaging member of the invention is shown applied to a wheelbarrow. The wheelbarrow basically comprises a frame member consisting of two spaced elongated tubular members 10 adapted to support a removable bin 11 therebetween by means of two spaced cross tubes 12 and 13 which interconnect the elongated tubular members 10. The cross tubes 12 and 13 interconnect the elongated members 10 intermediate their ends, the lower front spaced ends 14 of the elongated members 10 forming stub axles to support the ball 15 therebetween and the upper rear spaced ends being adapted to act as handles 16.

The removable bin 11 is preferably a moulding in a plastics material, such as polyethylene which provides a light-weight but strong and rigid construction. The bin is suitably shaped to fit between the elongated tubular members 10 and is provided with moulded transverse lips or lugs to fit onto the cross tubes 12 and 13 interconnecting the longitudinal tubular members 10. The bin 11 is furthermore provided with moulded sections on its external surface for receiving the removable feet 17 or like support members spaced one on each side of the bin.

The bin is designed so that its deepest part is behind the centre of gravity of the barrow, the bin curving upwardly from its deepest part to a shallow section having a front lip portion 18 located over the ground engaginer ball 15. The construction locates the centre of gravity of the barrow just behind the ground engaging ball 15 so as to allow for easy forward tipping.

Referring now to FIGS. 2 and 3 the ground engaging ball 15 is moulded in one piece from a suitable material such as rubber or plastics. A plastics material such as a mixture of an ethylene-vinyl acetate (EVA) co-polymer and a low density polyethylene is preferred. EVA co-polymers are thermoplastic materials produced by co-polymerising vinyl acetate monomer with ethylene monomer during the polymerisation process. The proportion of the mixture is most important and we have discovered that for satisfactory operation the proportion of EVA to low density polyethylene should be in the range of 7½% EVA up to 12½% EVA. If the EVA content is reduced much below 7½% the ball itself becomes too rigid to operate with pneumatic qualities, and becomes a hard structure. It is therefore, not suitable for use over stony or rough ground although it would perform reasonably satisfactorily in soft ground such as sand. If the EVA content is increased beyond 12½% in normal temperatures such as in England, except in the hottest part of the summer, the ball operates satisfactorily up to an EVA content of 25%. However, in hot countries, where the ambient temperature exceeds 20° C, any increase over the 12½% EVA content causes the ball to expand and distort, and for countries where the ambient temperature exceeds 25° C, the EVA must be kept down to 7½%.

The ball 15 is preferably moulded with suitable treads as shown by the reference 19 together with a valve 20 for inflation of the ball. It has been discovered that the ball should be inflated to a pressure of at least 6 pounds per square inch. A drop in pressure below 6 pounds per square inch causes poor performance when the wheelbarrow is heavily laden. Any substantial increase above 6 pounds per square inch can cause the ball to distort when placed in direct sunlight or in temperatures of more than 20° C.

As shown in FIG. 3 the ball is also moulded with two diametrically opposite sockets 21 adapted to support the ends of the stub shafts 14 of the longitudinal frame members 10 through the intermediary of suitable bearings. The bearings comprise a pair of interengaging bearing cups which are injection moulded from hard nylon 6 which is a nylon having exceptionally good and abrasive wear characteristics. The outer cup-shaped bearing 22 fits tightly within the socket 21 and is formed on its outer surface with a plurality of cutting fins 23 which cut into the surface of the socket 21 as the bearing is fitted into the socket. The length of the bearing 22 is such that it is slightly spaced from the inner end of the socket 21 when its flange 24 abuts against the outer surface of the ball as shown. The outer bearing 22 is therefore firmly and non-rotatably fitted within the socket 21.

The bearing 22 rotatably receives the inner bearing 25 which slides snugly within the outer bearing 22 and is formed with a flange 26 which abuts the flange 24 of the outer bearing in its operative position. In this position it will be seen that the cup-shaped inner bearing 25 has an axial length which is such that its inner end wall 27 is spaced from the inner end wall 28 of the outer bearing 22. The inner bearing 25 non-rotatably receives the inner end of the stub shaft 14 and to this end of the inner bearing is formed with a web 29 which engages within a slot 30 formed in the end of the stub shaft 14.

The design of the bearing as shown in FIG. 3 is such that the inner nylon bearing 25 rotates within the outer nylon bearing 22 and the friction is nylon against nylon, causing no wear upon the ball or the frame of the wheelbarrow. If the frame were to be permitted to bear on the ball, the ball would wear away, and if the stub shaft were to bear on the bearing, the bearing might wear. It would be appreciated that the bearing forces are against the outer flanges 24 and 26 and within the walls of the bearings but not against any of the inside end walls of the bearings. If pressure occurs on the inside of the bearings this would cause the sockets to stretch which inturn would put the ball out of circular. With the design of bearing described above all the side thrust is taken by the flanges 24 and 25 which are then supported by the wall of the ball itself.

An alternative construction of ball is shown in FIG. 4. In this construction the ball 15 is moulded with ribs or channels 31 which extend towards the rotational axis of the ball parallel to the treads 19. The provision of the ribs 31 is such that it is possible for the ball to act as a pneumatic member without the necessity of the ball retaining air in a captive capacity. The ribs provide a peripheral beam strength around the circumference of the ball at the point where contact is made with the ground which is sufficient to prevent the ball from collapsing so there is no need to have any pressure inside the ball. At the same time the ribs have a small amount of flexibility and between each other a concertina effect which is similar to that obtained by the use of a pressure of air inside the ball and this flexibility of the ribs is shown in FIG. 5 by the chain lines. The effect of the addition of the ribs is that if the ball is punctured it would not affect the pneumatic performance of the ball. In view of this the ball need no longer have a valve and the construction of FIG. 4 need no longer be concerned with the inflation of the ball and the necessity of ensuring that the correct inflation pressure is used.

In the construction of FIG. 4 the channels 31 are shown as U-shaped. FIGS. 6 and 7 show alternative shapes for the ribs. In FIG. 6 the channels 32 are V-shaped and in FIG. 7 the channels 33 are U-shaped with sloping sides. It has been discovered that various ribs have slightly different effects due to the flexing of the ribs in the transverse direction during use.

In another embodiment of the invention (not shown) the ball is moulded with a central tube which extends right through the ball for receiving a complete axle tube.

The ground engaging member of the invention in the form of a ball is considerably easier to manufacture than a conventional wheel and has a superior performance to a wheel over soft ground because its spread on the ground covers a wider area causing a lower point load on the ground. The use of a ball is less likely to mark lawns or to sink into mud, earth or sand or other broken ground. The wide spread of the ball compared with a wheel means that less accuracy is required when travelling along a narrow path such as a plank. In addition because the ball is hubless it can travel over objects more easily due to the fact that the ball can absorb the object more deeply so that the resultant angle of climb for the ball to climb over the object is made shallower and therefore, easier.

I claim:

1. A wheelbarrow comprising a frame and a supporting ground engaging ball member rotatably mounted therein, said ball member being molded in one piece from a plastic material consisting of a mixture of an ethylene-vinyl acetate co-polymer and a low density polyethylene with diametrically opposite sockets therein, a bearing assembly mounted in each of said sockets, said frame terminating in stub shafts adapted to fit a bearing assembly, said bearing assemblies each having an outer cup-shaped member non-rotatably mounted in a socket with said outer cup-shaped member terminating in an outer peripheral flange for engaging the outer surface of said ball member, said outer cup-shaped member being of a length less than the depth of said socket with the inner end of said cup-shaped member being spaced from the bottom of said socket upon the engagement of said peripheral flange with said ball member, an inner cup-shaped member non-rotatably mounted on said shaft and rotatably mounted in said outer cup-shaped member, said inner cup-shaped member terminating in an outer peripheral flange engaging the outer peripheral flange of the outer cup-shaped member, said inner cup-shaped bearing being of a length less than said outer cup-shaped member with the inner end of said inner member being spaced from the inner end of the outer cup-shaped member upon the engagement of said flanges of said cup-shaped members.

2. A wheelbarrow comprising a frame and a supporting ground engaging ball member rotatably mounted therein, said ball member being molded in one piece from a plastic material consisting of a mixture of an ethylene-vinyl acetate co-polymer and a low density polyethylene with diametrically opposite sockets therein, a bearing assembly mounted in each of said sockets, said frame terminating in stub shafts adapted to fit a bearing assembly, said bearing assemblies each having an outer cup-shaped member non-rotatably mounted in a socket with said outer cup-shaped member terminating in an outer peripheral flange for engaging the outer surface of said ball member, said outer cup-shaped member being of a length less than the depth of said socket with the inner end of said cup-shaped member being spaced from the bottom of said socket upon the engagement of said peripheral flange with said ball member, an inner cup-shaped member non-rotatably mounted on said shaft and rotatably mounted in said outer cup-shaped member, said inner cup-shaped member terminating in an outer peripheral flange engaging the outer peripheral flange of the outer cup-shaped member, said inner cup-shaped bearing being of a length less than said outer cup-shaped member with the inner end of said inner member being spaced from the inner end of the outer cup-shaped member upon the engagement of said flanges of said cup-shaped members, the outer surface of said outer cup-shaped member formed with cutting fins for engaging the wall of said socket and the inner surface of said inner cup-shaped member formed with a web for engaging a slot on said stub shaft.

* * * * *